United States Patent [19]
Strader

[11] 3,879,883
[45] Apr. 29, 1975

[54] GLITTER FISHING LURE
[76] Inventor: James W. Strader, P.O. Box 4029, Tallahassee, Fla. 32303
[22] Filed: June 18, 1973
[21] Appl. No.: 371,306

[52] U.S. Cl. .............................................. 43/42.32
[51] Int. Cl............................................. A01k 85/00
[58] Field of Search............. 43/42.32, 42.33, 42.34, 43/42.53

[56] References Cited
UNITED STATES PATENTS

| | | | |
|---|---|---|---|
| 2,117,206 | 5/1938 | Neff | 43/42.34 X |
| 2,353,995 | 7/1944 | Conner | 43/42.32 UX |
| 2,752,721 | 7/1956 | Denny | 43/42.34 X |
| 2,938,293 | 5/1960 | Richardson | 43/42.32 X |
| 3,367,060 | 2/1968 | Abercrombie | 43/42.33 |

*Primary Examiner*—Louis G. Mancene
*Assistant Examiner*—Daniel J. Leach

[57] ABSTRACT

A fishing lure and the method of making the same having an improved artificial surface which increases the fish-like appearance and touch sensation of the lure by providing a reflective glittered surface that appears and fees to be real fish scales such that a fish investigating a lure will believe it to be another fish. The realistic scale-like lure surface is achieved by molding into a plastic lure plug a glitter composed of 15 per cent by volume reflective glass grit. A mineral oil additive is utilized in the molding process to maximize random distribution of the grit within the plastic. The molded lure is washed in a solvent such as ethylene dichloride to expose surface grit.

1 Claim, 3 Drawing Figures

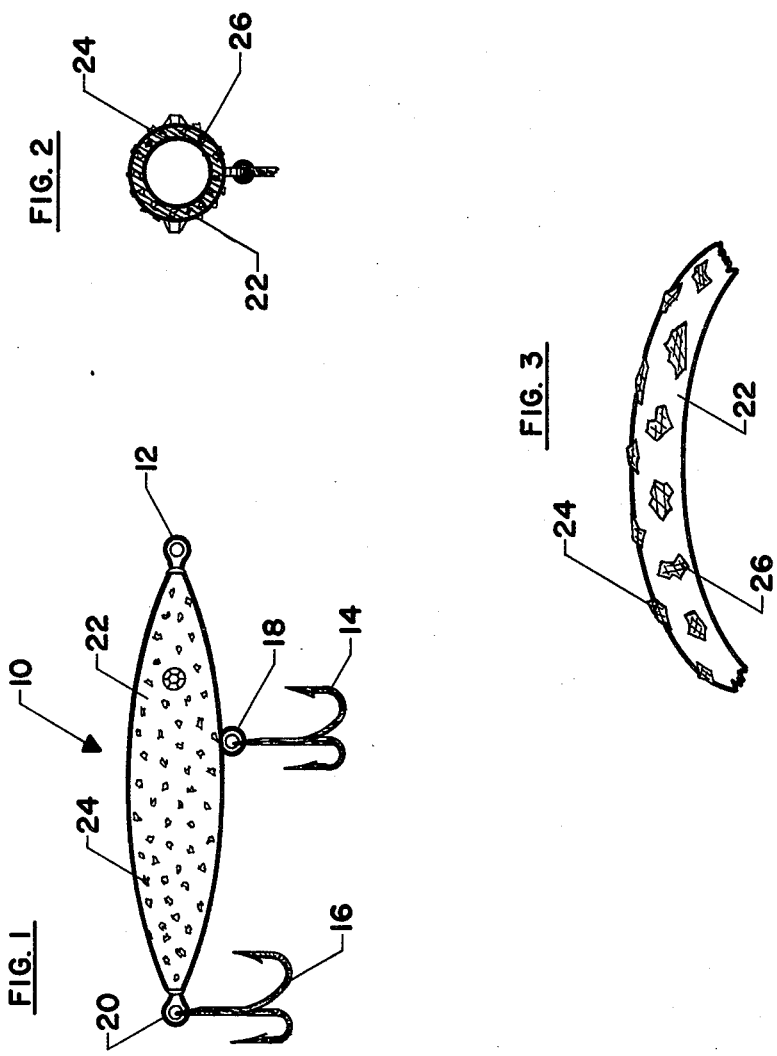

GLITTER FISHING LURE

BACKGROUND OF THE INVENTION

This invention relates generally to an artificial fishing lure and the method of making the same and specifically relates to an improved lure and method of making which provides a realistic fish-like surface on the lure.

In the past, several different lures have been constructed in different ways in an attempt to achieve a scale-like surface that looks like a bait fish, having a certain reflectivity and certain surface coarseness. Many of these attempts have involved very complicated and complex operations in the construction of the lure which increase its cost while still not achieving a satisfactory, realistic lure. Applicant's invention overcomes these problems in a very simple and non-complex method and achieves an improved lure of realistic appearance. Applicant's lure may be constructed with plastic injection molding utilizing a plastic and glitter mixture.

BRIEF DESCRIPTION OF THE INVENTION

An artificial fishing lure and the method of making the same comprising a molded, plastic lure body having randomly distributed throughout a plurality of heat resistant glitter, said glitter being embedded and partially exposed along the surface of said lure. The lure is constructed and molded from a translucent plastic material which begins before it is put into the molding process as small chunks of aggregate of the plastic material. A mixture of heat resistant glitter (such as glass grit) and clear mineral oil is mixed in bulk with the plastic aggregate. The mineral oil coats each particle of plastic aggregate and through the process of mixing the plastic aggregate, the glitter and mineral oil, the heat resistant glitter adheres to the oil film on each aggregate piece. This causes an even, random distribution throughout the plastic aggregate of the glitter. The mixture is placed in a hopper of a molding machine, heated and further mixed until the heat resistant glitter is evenly distributed through the then viscous plastic, where upon it is injected into the mold. The viscous plastic with the glitter in suspension and under pressure is then allowed to cool and is ejected out as a complete part with the heat resistant glitter embedded throughout the plastic lure shell. The exterior surface is then washed with ethylene dichloride which partially exposes glitter adjacent the surface and resets the plastic material itself along the surface giving it a scale-like finish due to its unevenness with the combination of the glitter particles that are partially exposed and irregularities in the surface of the plastic itself.

Due to the varied and randomly disposed glitter particles ranging in depth from the exterior surface, various light intensities are reflectively achieved randomly giving the appearance of fish scales, there being some particular points of high reflectivity and other of diminished reflectivity along the surface in a random distribution. Thus, applicant's fish lure and the method of making it reduces the cost of manufacture while increasing the natural appearance of the lure.

It is an object of this invention to provide an improved artificial fishing lure having a more realistic fish-like appearance and touch.

It is another object of this invention to provide an artificial fishing lure of increased realistic appearance while reducing the cost of manufacture and the complexity of the manufacturing process.

And still yet another object of this invention is to provide an artificial fish lure and the method of making the same having random distributed glitter throughout a thermoplastic body of varying intensities to provide a surface appearance of a fish lure similar to that of the scales of a fish.

In accordance with these and other objects which will be apparent hereinafter, the instant invention will now be described with particular reference to the accompanying drawings.

BRIEF DESCRIPTION OF THE DRAWINGS

FIG. 1 shows an elevational side view of a fishing lure constructed in accordance with the invention.

FIG. 2 shows an elevational, cross-section through a center portion of the fishing lure body.

FIG. 3 shows an enlarged cross-sectional surface portion of a fishing lure of the invention.

PREFERRED EMBODIMENT OF THE INVENTION

Referring now to the drawings, the invention is shown generally at 10 comprising a thermoplastic body 22 of a conventional shape having a standard line connecting eye 12 connected at the forward end of the plug body and plurality of hooks 14 and 16 one of which is connected beneath the plug body by connecting eye 18 and the other which is connected to the rear of the plug through eye 20. Observable on the plug body are a plurality of glitter particles, one shown at 24, which are randomly distributed throughout the plug body.

FIG. 2 shows a selected glitter particle 24 which is partially exposed breaking the surface of the fishing lure body 22. A second selected glitter particle 26 is shown embedded beneath and below the surface of the plug body. Partially exposed surface particles 24 and submerged and embedded particles 26 are randomly distributed about the exterior surface and the interior respectively.

FIG. 3 shows a glitter particle 24 partially embedded in plug body 22 and partially exposed along the surface as are other particles shown. Another glitter particle 26 is shown embedded beneath the surface. As a light ray strikes the plug body, light rays are reflected at the outer surface by some of the partially exposed glitter particles and of reduced intensity reflection at different depths within the plug body at random points depending upon the particular distribution of the glitter particles within the plug body 22. Also, the surface portions of the plug body not having glitter particles is somewhat contoured by this method. The overall result is a random distribution of light of varying glitter intensities giving it a natural fish-like appearance.

The process for constructing the fishing lure includes the use of injection molding with small aggregate plastic particles that are placed in an injection mold hopper, mixed and heated and injected in hot viscous form under pressure into a mold where the material takes the shape of the mold and when allowed to cool forms a hardened fish lure body. However, applicant achieves the improved appearance and feel by providing a mixture of heat resistant glitter which may be a 15 per cent by volume of reflective glass grit in the hopper with the plastic aggregate and a clear mineral oil, the entire unit mixed in bulk with the aggregate. The mineral oil serves to provide a coating on each chunk of the plastic aggregate and through the mixing process caauses the glass grit to adhere to the film on each chunk providing an even distribution of the grit throughout the plastic aggregate. The bulk is then heated and further mixed until the heat resistant glass grit is evenly distributed throughout the then viscous plastic which is then injected into the mold. The viscous plastic with the glitter in suspension and under pressure is then allowed to cool and is ejected as a formed body unit to be utilized as a fish lure. The body is then finished by washing it with a solvent, such as ethylene dichloride, which washes the the surface of the plug body and the partially exposed glitter particles, removing portions of plastic which may be covering the glitter on the surface. The ethylene dichloride also serves to cause surface irregularities on the plastic portions of the exterior surface, giving it, in combination with the partially exposed glitter particles an unsmooth finish, variable reflected surface which looks and feels like fish scales. Other translucent plastic material and other solvents may be utilized in the process to achieve the desired result.

EXAMPLE I

In a specific process, first one pound (weight) of plastic aggregate is combined with one ounce (weight) amount of mineral oil and an amount of 15 percent by volume reflective glass grit are placed in a hopper and mixed so that the oil coats the plastic and the glass grit then adheres to the surface of the plastic aggregate. This mixture is then heated to approximately 425° Fahrenheit and randomly distributes the glass grit throughout the plastic mixture. The mixture is then injected, molded into the shape desired of the fishing lure body and cooled. After sufficient cooling, the exterior surface of the lure is cleansed and washed with ethylene dichloride to expose portions of the glitter that lie on the surface itself and to contour the remaining plastic exterior surface to a rough feeling surface.

The instant invention has been shown and described herein in what is considered to be the most practical and preferred embodiment. It is recognized, however, that departures may be made therefrom with the scope of the invention and that obvious modifications will occur to a person skilled in the art.

What I claim is:

1. A fishing lure comprising:

a translucent plastic body;

a line receiving means connected to said body;

a hooked means connected to said body, and said body including a plurality of imbedded reflective particles randomly distributed throughout said body, said body having a hill and dale surface providing a generally irregular transparent surface for viewing said reflective particles, said reflective particles having a number of said reflective particles partially exposed on the surface of said body.

* * * * *